United States Patent Office 3,425,448
Patented Feb. 4, 1969

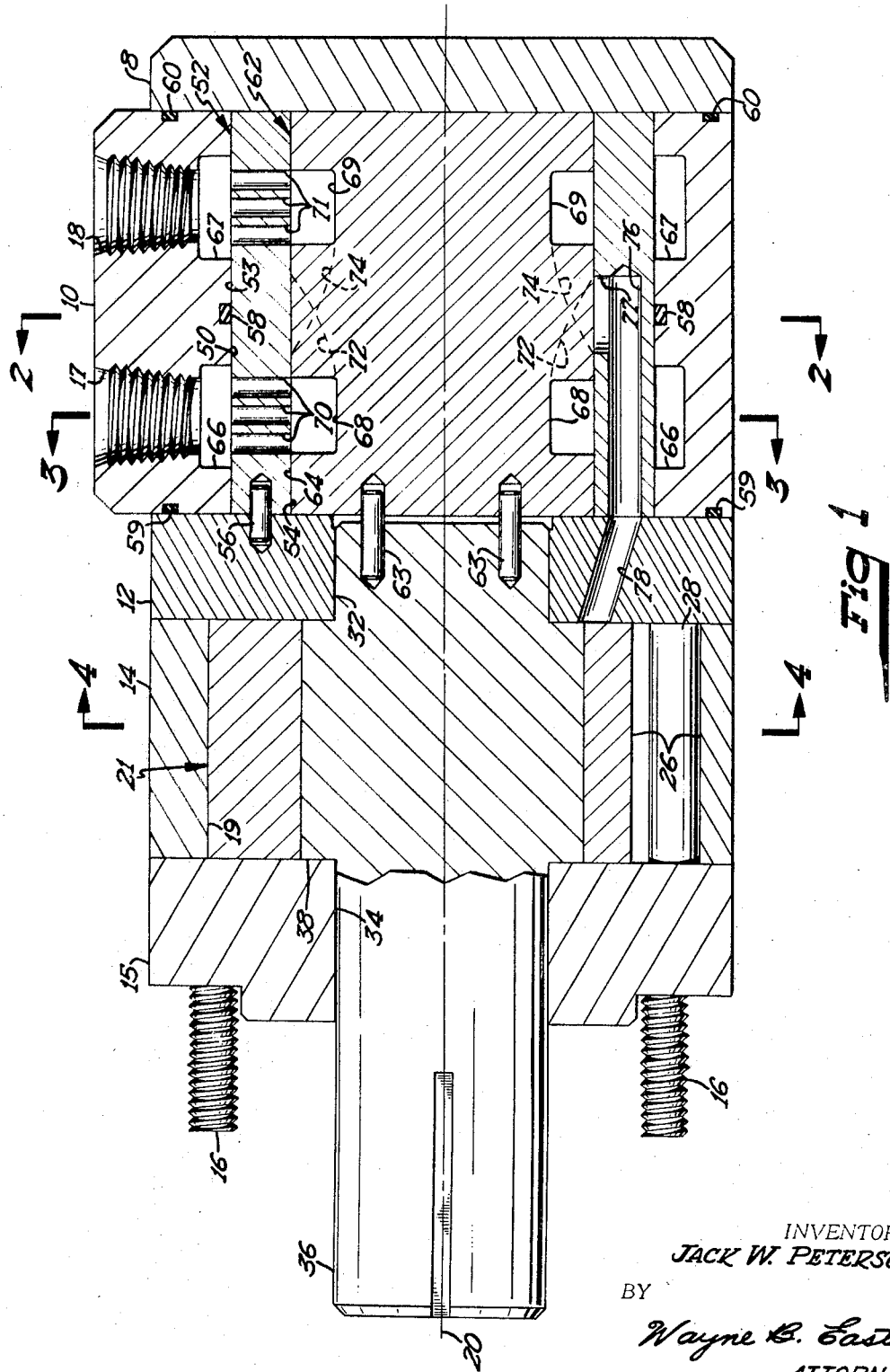

3,425,448
FLUID PRESSURE BALANCED VALVE
Jack W. Peterson, Brooklyn Center, Minn., assignor to Char-Lynn Company, Eden Prairie, Minn., a corporation of Minnesota
Filed July 1, 1966, Ser. No. 562,140
U.S. Cl. 137—625.24   1 Claim
Int. Cl. F16k 5/12, 5/14, 25/00

ABSTRACT OF THE DISCLOSURE

A fluid pressure balanced valve comprising a sleeve affixed in a casing and a valve member moveably positioned within the sleeve, the casing having a first annular channel in communication with openings in the sleeve, and the valve member having a second annular channel in fluid communication with the first annular channel, the first and second channels positioned in axially overlapping relation with the sleeve between, whereby pressure on the external surface of the sleeve is overcome by corresponding pressure on the internal surface of the sleeve.

---

This invention relates generally to valves and more specifically to the fluid pressure balancing of a type of valve which has a cylindrically shaped rotary or axially slidable valve element with recessed fluid passages in the cylindrical surface thereof which cooperate with valve passages in the bore of the valve casing.

Valves having cylindrically shaped valve elements of the type referred to are very common in a wide variety of fluid pressure devices. A problem encountered with this type of valve when utilized in a high pressure system is that highly pressurized fluid which is directed to the recessed passages in the cylindrical surface of the valve element also flows into the clearance between the valve element and the valve casing with the result that there is a tendency to expand the casing and increase the clearance beyond a desirable limit. An obvious solution to the above problem which has been used in the past is to make the valve casing wall sufficiently thick so that the tendency of the casing to expand upon being acted upon by a high pressure fluid is resisted.

A superior solution in accordance with the present invention is to provide a sleeve member between the cylindrically shaped valve element and the valve casing which is in fixed relation to the casing and is provided with certain valving passages which in prior art devices are normally provided in the casing. The valving and porting arrangement of the sleeve member is arranged so that the external cylindrical surface thereof and the internal bore surface of the valve casing are acted upon by the pressurized fluid so that there is little or no resultant pressure which is effective to cause radial expansion of the sleeve member.

An advantage of providing a sleeve member as described is that a close clearance is maintained between the valve element and the sleeve member, between which the valving passages are provided, with the result that the leakage of pressurized fluid through the clearance is substantially minimized. Although the casing is subject to radial expansion relative to the sleeve member, such expansion of the casing does not produce any leakage losses because the casing and sleeve members are fixed relative to each other and conventional sealing means which are completely effective can simply and easily be provided therebetween.

A main object of the invention is to provide a new and improved valve assembly of the type referred to above which is especially adapted for use with high pressure fluid in the manner described above.

Other objects and advantages will become apparent from the following specification, appended claim and attached drawings.

Figure 3:
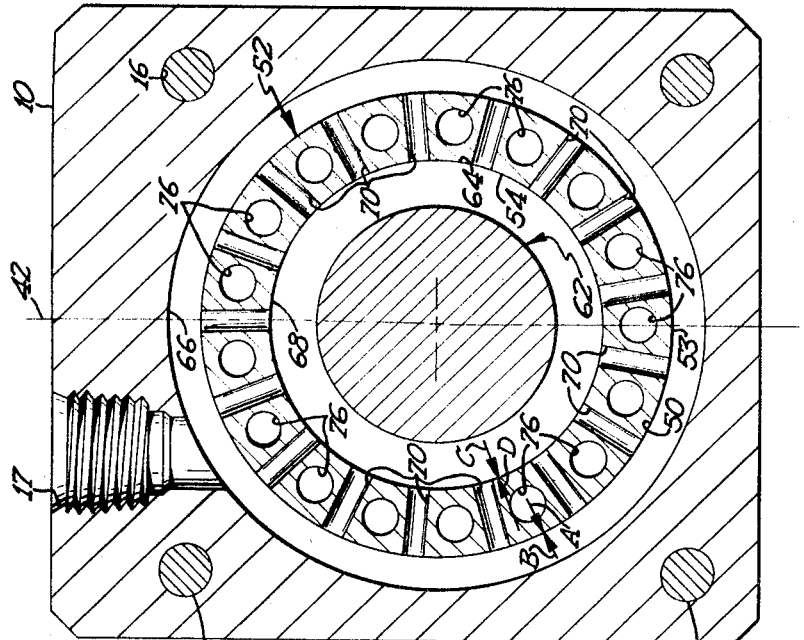
Figure 2:
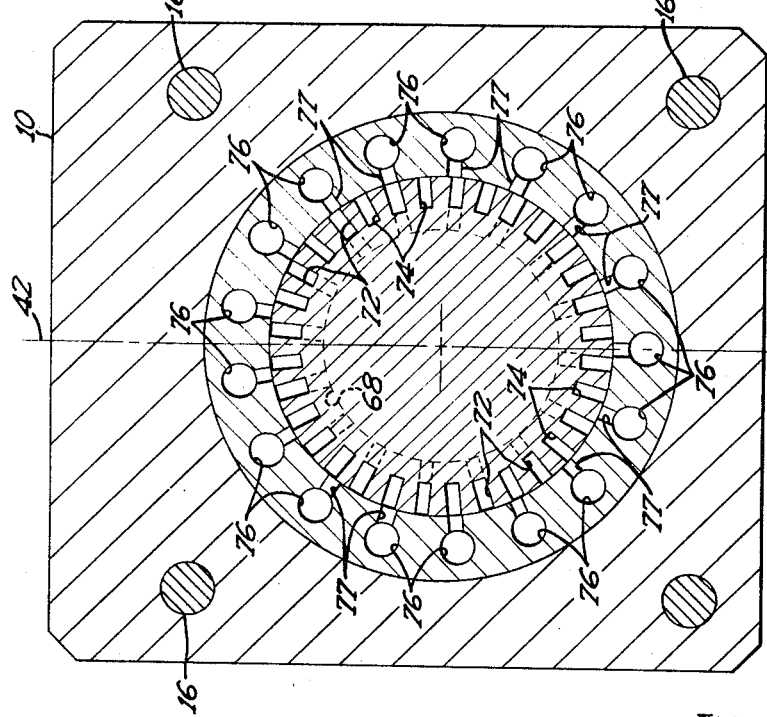

In the drawings:
FIG. 1 is a longitudinal sectional view of a fluid pressure device such as a pump or a motor in which a vlave assembly in accordance with the present invention is incorporated;
FIG. 2 is a transverse sectional view taken on line 2—2 of FIG. 1;
FIG. 3 is a transverse sectional view taken on line 3—3 of FIG. 1; and
FIG. 4 is a transverse sectional view taken on line 4—4 of FIG. 1.

The present invention has general utility and it is only by way of example that it is illustrated herein as being embodied in a fluid pressure device which may be utilized as a pump or a motor.

In the fluid pressure motor or pump illustrated in FIGS. 1 to 4 there is provided a casing or housing made of several sections which are an end cap 8, a valve casing section 10, a fluid passage casing section 12, a gerotor casing section 14 and an end section 15. Casing sections 8, 10, 12, 14 and 15 are generally rectangular in shape and are held together in axial and radial alignment by four circumferentially spaced bolts 16. Casing section 10 is provided with inlet and outlets ports 17 and 18 which could be reversed for operation of the pump or motor in the opposite direction.

Figure 4:
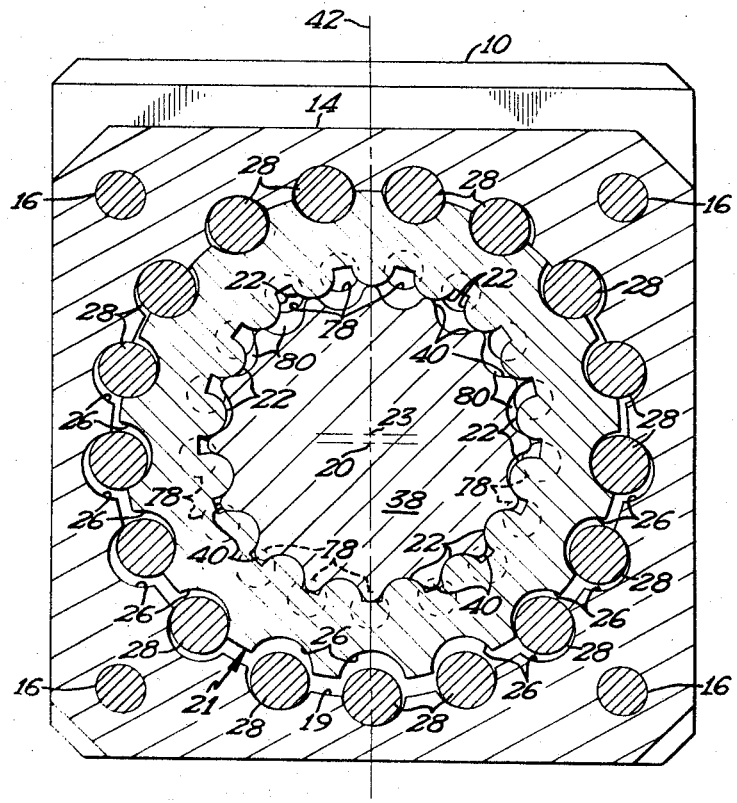

Referring to FIG. 4, gerotor casing section 14 has a cylindrical bore 19 which is concentrically disposed relative to a longitudinally extending axis 20. Disposed in bore 19 is a generally annularly shaped ring member 21 which has a plurality of circumferentially arranged internal teeth 22 which are circumferentially arranged to the geometric axis 23 of ring member 21. Ring member 21 is equal in axial length to casing section 14 and is in sealing engagement with adjacent annular surfaces of casing sections 12 and 15 between which ring member 21 disposed. Ring member 21 has a cylindrically shaped outer surface which is concentric relative to the geometric axis 23 of ring 21 and is adapted to have orbital movement about axis 20. The outside diameter of ring 21 is illustrated as being equal to the diameter of casing bore 19 minus twice the distance between axes 20 and 23. The outside diameter of ring 21 may be somewhat smaller than illustrated, relative to the casing bore 19, but not larger if interference is to be avoided.

A plurality of articulated holes 26 are provided between ring 21 and casing section 14. Each hole 26 would have the two halves thereof in a cylindrically shaped locus if ring 21 were concentrically positioned relative to casing section 14. As ring 21 is always eccentrically disposed relative to casing section 14, however, none of the holes 26 ever have both surfaces thereof entirely within a single cylindrically shaped locus.

Disposed in holes 26 are a corresponding number of cylindrically shaped rollers 28. The effective diameter of each hole 26 is equal to the diameter of a roller 28 therein plus twice the distance between axes 20 and 23. The rollers 28 provide torque transmitting connections between ring 21 and casing section 14 and with the construction illustrated a rolling action results between the rollers 28 and ring 21, and between the rollers and casing section 14, during orbital movement of ring 21 relative to casing section 14.

Casing sections 12 and 15 have bores 32 and 34 which constitute bearing surfaces and which are concentric relative to axis 20. Rotatably disposed and journalled in bores 32 and 34 is a shaft 36 which has an intermediate shaft portion 38 of larger diameter than the end portions of the shaft. Intermediate shaft portion 38 has the form of an externally toothed star member which has at least one fewer teeth 40 than ring member 21 with the teeth 40 thereof being in meshing engagement with the teeth 22 of ring member 21. Rotation of shaft 36 causes rotation of star 38 about axis 20 which in turn imparts an orbital movement to ring member 21 which defines a circular orbital path about the axis 20. Ring member 21 and star member 38 comprise a gerotor mechanism which may be used as the cooperating elements of a fluid pressure motor or pump. During rotational movement of star member 38 about axis 20, and during orbital movement of ring member 21 about axis 20, the star teeth 40 thereof intermesh with the ring member teeth 22 in sealing engagement to form expanding and contracting cells which are equal in number to the number of star member teeth 40.

With reference to FIGS. 2 to 4, a vertical centerline 42 incidentally represents the line of eccentricity for the ring member 21 for that particular position of the ring member relative to the star member 38. The line of eccentricity is defined herein as a line which is perpendicular to and intersects the star and ring axes 23 and 20 for all orbital positions of the ring 21. During orbital movement of the ring member 21, and assuming the orbital movement of the ring is clockwise as viewed in FIG. 4, the cells on the left side of the line of eccentricity would be expanding and the cells on the right side would be contracting. Casing sections 12 and 15 form sides for the gerotor chamber so that the expanding and contracting cells formed between the teeth of the gerotor star and ring members will be closed for all orbital positions of the ring member 21.

In operation a star member 38 having sixteen teeth will make one revolution about its own axis 20 for every sixteen times the ring member 21 orbits in the opposite direction about axis 20. When the fluid pressure device is utilized as a pump or a motor the star 38 is caused to rotate in one direction about its own axis and ring member 21 will be constrained to move in an orbital path about the same axis in the opposite direction by reason of the roller and hole construction provided between ring member 21 and casing section 14.

Valve casing section 10 has an axially extending bore 50 which is concentric relative to axis 20. Disposed in bore 50 is an annularly shaped sleeve member 52 having cylindrically shaped external and internal surfaces 53 and 54 and being of the same axial length as casing section 10. Sleeve 52 is held in fixed relation to casing section 10 by means of a plurality of circumferentially arranged pins 56 disposed in axially extending holes formed jointly in casing section 12 and sleeve 52. Sleeve 52 has a relatively loose fit relative to valve casing bore 50 so that there is no obstruction to the flow of fluid between surfaces 50 and 53 by reason of a closeness of fit between these surfaces.

Sealing means are provided which facilitate the maintaining of fluid under pressure between the surfaces 50 and 53. The sealing means provided for this purpose comprise an O-ring 58 positioned between cylindrical surfaces 50 and 53 and between ports 17 and 18, an O-ring 59 positioned between annular abutting surfaces of casing sections 10 and 12, and an O-ring 60 positioned between abutting surfaces of casing sections 10 and 8. The O-ring 58 prevents the short circuiting of fluid between ports 17 and 18 through the clearance between cylindrical surfaces 50 and 53. O-rings 59 and 60 prevent fluid in the clearance between surfaces 50 and 53 from flowing from either of the ports 17 or 18 to the exterior of the device.

Rotatably disposed in sleeve 52 is a valve 62 which is connected to shaft 36 in driving relation thereto by a plurality of drive pins 63. Valve 62 has a cylindrically shaped surface 64 which is in close fitting relation to the sleeve bore 54 so as to minimize the flow or leakage of fluid between the surfaces 54 and 64.

Casing section 10 is provided with two annular channels 66 and 67 in the bore 50 thereof which are in respective axial alignment with the ports 17 and 18 of casing section 10. Valve 62 is likewise provided with two annular channels 68 and 69 in the cylindrical surface 64 thereof which are in respective axial alignment with the annular channels 66 and 67 of casing section 10. Sleeve 62 has three rows of circumferentially arranged holes 70 which provide for the free fluid communication between annular channels 66 and 68. Sleeve 62 also has three rows of circumferentially arranged holes 71 which provide for the free fluid communication between annular channels 67 and 69.

Casing sections 10 and 12, sleeve member 52 and valve 62 are provided with fluid passages through which fluid is conveyed from the port 17 or 18 to the cells of the gerotor on one side of the line of eccentricity 42 and exhausted from cells on the other side of the line of eccentricity to the other of the ports 17 or 18. Port 17 or 18 will be the inlet, and the other the outlet port, depending on the direction of rotation desired for shaft 36. With reference to FIGS. 1 to 4, valve 62 has in the surface 64 thereof a plurality of sixteen axially extending, circumferentially arranged and spaced slots 72 which intersect and are in fluid communication with annular channel 68 and a plurality of sixteen axially extending, circumferentially arranged slots 74 which are alternately spaced relative to slots 72 and which are in fluid communication with annular channel 67.

Sleeve member 52 has a plurality of seventeen axially extending circumferentially arranged and spaced passages 76 of circular cross section which extend axially from points between annular channels 68 and 69 to casing section 12. Short radially extending passages 77 connect passages 76 with the internal space defined by the sleeve bore 54. Casing section 12 also has a plurality of seventeen generally axially extending, circumferentially arranged and spaced passages 78 which have respective fluid communication, at the right ends thereof, with passages 76 of sleeve member 52 and with the chamber defined by ring member 21 at points in the vicinities of the junctions between the ring member teeth 22 at the left ends thereof.

Upon rotation of valve 62, each of the slots 72 and 74 thereof successively registers in fluid communication with each of the openings 77 in the bore 54 of sleeve member 52. Assuming that the fluid pressure device is functioning as a motor and that pressurized fluid is introduced through port 17, the fluid will flow into annular channel 66, through passages 70 in the sleeve 52, into annular channel 68 of valve 62, and into slots 72 of valve 62. When valve 62 and star 38 are in their respective positions as shown in the drawings, fluid will be flowing from valve passages 72 into sleeve passages 77 and 76 on the right side of the line of eccentricity 42 as viewed in FIG. 2, through casing passages 78 on the left side of the line of eccentricity as viewed in FIG. 4, to the gerotor cells 80 on the left side of the line of eccentricity 42 as viewed in FIG. 4. At that instant the cells 80 on the left side of the line of eccentricity are expanding while the cells 80 on the right side of the line of eccentricity are collapsing. The flow of inlet fluid through valve slots 72 causes ring 21 to orbit in a clockwise direction, as viewed in FIG. 4, while star 38 rotates in a counterclockwise direction. Fluid from the collapsing cells 80 flows through casing passages 78 on the right side of the line of eccentricity 42, as viewed in FIG. 4, through sleeve passages 76 and 77 on the left side of the line of eccentricity 42 as viewed in FIGS. 2 and 3, through valve slots 74 on the left side of the line of eccentricity 42 as viewed in FIG. 2 to annular channel 69 of valve 62, through sleeve passages 71 into annular channel 67 of casing section 10 and out through casing port 18.

The above description of fluid flow is only for an instantaneous condition in that the line of eccentricity 42 in effect rotates about shaft axis 20. As long as pressurized fluid is admitted through port 17, however, the pressurized fluid will always be admitted to gerotor cells on the same side of the line of eccentricity 42 and fluid will always be exhausted from gerotor cells on the other side of said line.

During orbiting of ring 21 about axis 20, the star 38 rotates in the opposite direction about axis 20 at a slower speed. The ratio between the orbiting and rotating speeds is dependent upon the ratio between the ring and star member teeth. If that ratio is seventeen to sixteen as illusrated herein, the rotating speed of the star will be one-sixteenth of the orbiting speed of ring 21. By reason of the direct drive connection between star 38 and valve 62, valve 62 rotates at the same speed and in the same direction as star 38. Valve 62 is a commutating type valve in that it rotates at the same speed that star 38 rotates but it functions to supply and exhaust fluid to and from the gerotor at the orbiting frequency of the ring 21.

Referring now to an additional functional aspect of sleeve 52, a portion of the pressurized fluid entering port 17 flows between casing bore surface 50 and sleeve surface 53 and the fluid between said surfaces will maintain its pressure by reason of the fluid being trapped by O-ring seals 58 and 59. The pressurized fluid between casing bore surface 50 and sleeve surface 53 exerts both a radially directed outward force A (see FIG. 3) which tends to expand casing section 10 and increase the clearance between surfaces 50 and 53 and a radially directed inward force B which has a compressive effect on sleeve 52. A portion of the pressurized fluid entering port 17 also flows between sleeve bore 54 and the external surface 64 of valve 62 which exerts a radially outwardly directed force C which acts on sleeve surface 54 and tends to balance the force B and a radially directed inward force D which has a compressive effect on valve 62.

Sleeve bore surface 54 and valve surface 64 are sealing surfaces because it is essential that pressurized inlet fluid be constrained from escaping from annular channel 68 and from short circuiting from valve slots 72, which are pressurized feed passages, to valve slots 74 which are exhaust passages. Surfaces 54 and 64 are thus made to be close fitting so that they will perform the required sealing function. As pressurized fluid cannot be prevented from flowing between surfaces 54 and 64 and exerting a radially directed force C which would normally act to radially expand sleeve 52, it is a main object of the invention to provide a radially inwardly directed counterbalancing force B which acts on the exterior surface 53 of sleeve 52 in the manner described above. The net result is that the radial forces C and B acting on sleeve 52 are balanced and sleeve 52 is thus not subject to being expanded radially and the desired clearance between valve 62 and sleeve 52 is not subject to being enlarged by reason of such expansion. The radially directed force A will tend to expand casing section 10 and enlarge the casing bore 50 but this does not create any harmful effect.

The above discussion relating to sleeve 52 is based on port 17 being used as the inlet port. If port 18 were used as the inlet port the pressure and exhaust passages would be reversed but the overall results would be the same.

While one embodiment of the invention is described herein, it will be understood that it is capable of modification, and that such modification, including a reversal of parts, may be made without departure from the spirit and scope of the invention as defined in the claim.

What I claim is:

1. A valve having a casing with a cylindrically shaped bore, a sleeve member having cylindrically shaped external and internal surfaces, said sleeve member being disposed in substantially fixed relation to said casing and with sufficient clearance being provided to permit fluid to flow axially between said casing bore and the external surface of said sleeve member, said sleeve member having a plurality of circumferentially arranged passages, a cylindrically shaped valve member having an external surface disposed in said sleeve member and being moveable relative thereto, said valve member having a plurality of recessed passages in the external surface thereof in fluid communication with the plurality of circumferentially arranged passages in said sleeve member, a first annular channel defined between said casing and said sleeve member, port means in said casing having fluid communication with said first annular channel, a second annular channel defined between said sleeve and valve members in axially overlapping relation to said first annular channel for all positions of said valve member and in fluid communication with the plurality of recessed passages in said valve member, and fluid passage means in said sleeve member providing constant fluid communication between said annular channels.

References Cited

UNITED STATES PATENTS

| Re. 25,126 | 2/1962 | Charlson | 137—625.24 XR |
| 2,917,027 | 12/1959 | Hayse | 137—625.24 |
| 3,283,723 | 11/1966 | Charlson | 103—130 |

HENRY T. KLINKSIEK, *Primary Examiner.*

U.S. Cl. X.R.

91—56; 60—52; 103—130; 137—625.3